(12) United States Patent
Lee

(10) Patent No.: US 9,080,795 B2
(45) Date of Patent: Jul. 14, 2015

(54) AIR CONDITIONING SYSTEM

(75) Inventor: Sanghun Lee, Changwon (KR)

(73) Assignee: LG ELECTRONICS INC., Seoul (KR)

( * ) Notice: Subject to any disclaimer, the term of this patent is extended or adjusted under 35 U.S.C. 154(b) by 574 days.

(21) Appl. No.: 12/992,665

(22) PCT Filed: May 4, 2009

(86) PCT No.: PCT/KR2009/002356
§ 371 (c)(1),
(2), (4) Date: Nov. 15, 2010

(87) PCT Pub. No.: WO2010/128693
PCT Pub. Date: Nov. 11, 2010

(65) Prior Publication Data
US 2011/0067436 A1    Mar. 24, 2011

(30) Foreign Application Priority Data

May 4, 2009  (KR) ..................... 10-2009-0038944

(51) Int. Cl.
*F25B 41/00* (2006.01)
*F25B 27/00* (2006.01)
*F25B 49/00* (2006.01)
(Continued)

(52) U.S. Cl.
CPC . *F25B 13/00* (2013.01); *F24D 5/12* (2013.01); *F24D 12/02* (2013.01); *F24H 1/121* (2013.01); *F28F 3/12* (2013.01); *F28F 21/02* (2013.01); *F28F 21/065* (2013.01); *H05B 3/145* (2013.01); *F24D 2200/08* (2013.01); *F24D 2200/12* (2013.01); *F24F 2221/56* (2013.01); *F25B 2313/005* (2013.01); *F25B 2313/008* (2013.01); *F25B 2313/023* (2013.01); *F25B 2313/02741* (2013.01); *F25B 2400/0411* (2013.01); *F25B 2500/28* (2013.01); *F25B 2500/31* (2013.01); *H05B 2214/04* (2013.01); *Y02B 30/12* (2013.01); *Y02B 30/14* (2013.01)

(58) Field of Classification Search
USPC .................. 62/324.1, 498, 513, 238.6–238.7, 62/196.4, 430; 219/643, 645, 687, 747, 219/534, 547, 546, 548, 549, 552–553
See application file for complete search history.

(56) References Cited

U.S. PATENT DOCUMENTS 4,731,072 A * 3/1988 Aid ............................... 604/408
5,305,822 A * 4/1994 Kogetsu et al. ............... 165/225

(Continued)

FOREIGN PATENT DOCUMENTS

KR   10-1999-0080295 A   11/1999
KR   10-2001-0065961 A    7/2001

(Continued)

OTHER PUBLICATIONS

Yeo-Hwan Yoon, Transparent Film Heater Using Single-Walled Carbon Nanotubes, Aug. 14, 2007, Advanced Materials, Wiley InterScience, pp. 4284-4287.*

(Continued)

*Primary Examiner* — Cheryl J Tyler
*Assistant Examiner* — Elizabeth Martin
(74) *Attorney, Agent, or Firm* — Ked & Associates, LLP

(57) ABSTRACT

An air conditioning system includes a refrigerant evaporated in an outdoor heat exchanger. The refrigerant is drawn into a compressor in a state heated by a heater that includes a carbon nanotube heating element in a heating mode to more stably and efficiently perform heating.

16 Claims, 6 Drawing Sheets

(51) Int. Cl.
- *F25B 1/00* (2006.01)
- *H05B 3/02* (2006.01)
- *F25B 13/00* (2006.01)
- *F24D 5/12* (2006.01)
- *F24D 12/02* (2006.01)
- *F24H 1/12* (2006.01)
- *F28F 3/12* (2006.01)
- *F28F 21/02* (2006.01)
- *F28F 21/06* (2006.01)
- *H05B 3/14* (2006.01)

(56) References Cited

U.S. PATENT DOCUMENTS

| | | | | |
|---|---|---|---|---|
| 5,984,198 | A * | 11/1999 | Bennett et al. | 237/2 B |
| 6,050,102 | A * | 4/2000 | Jin | 62/324.6 |
| 6,076,366 | A * | 6/2000 | Takano et al. | 62/196.4 |
| 6,490,882 | B2 * | 12/2002 | Tipton | 62/498 |
| 6,679,321 | B2 * | 1/2004 | Jin | 165/236 |
| 6,775,473 | B2 * | 8/2004 | Augustine et al. | 392/470 |
| 7,123,825 | B2 * | 10/2006 | Abbott | 392/466 |
| 2003/0188539 | A1 * | 10/2003 | Abras et al. | 62/3.3 |

FOREIGN PATENT DOCUMENTS

| | | | |
|---|---|---|---|
| KR | 10-2004-0015972 A | | 2/2004 |
| KR | 1020080083628 | * | 8/2008 |
| WO | WO 99/51919 | | 10/1999 |
| WO | WO 2006/023979 | | 3/2006 |
| WO | WO 2007089118 A1 * | 8/2007 | H05B 3/14 |
| WO | WO 2008/097557 | | 8/2008 |

OTHER PUBLICATIONS

Translation of KR 1020080083628.*
PCT International Search Report issued in Application No. PCT/KR2009/002356.
European Search Report dated Sep. 23, 2014.

\* cited by examiner

AIR CONDITIONING SYSTEM

CROSS REFERENCE TO RELATED APPLICATIONS

This application claims priority to Korean Patent Application Nos. 10-2009-0038944 filed on May 04, 2009, the entire contents of which are herein incorporated by reference.

BACKGROUND OF THE INVENTION

1. Field of the Invention

The present invention relates to an air conditioner system, and more particularly, to an air conditioner system including a heater for heating a refrigerant.

2. Description of the Related Art

Generally, a general air conditioning system includes a compressor, a 4-way valve, an indoor heat exchanger, and an outdoor heat exchanger, or the like, which configures a heat exchanging cycle, to cool or heat the room. In a heating mode, the outdoor heat exchanger is operated as an evaporator and the indoor heat exchanger is operated as an expander. In more detail, a refrigerant heat-exchanged with an outdoor air is compressed at high temperature and high pressure in the compressor, while being evaporated in the outdoor heat exchanger, and is heat-exchanged with an indoor air, while being condensed in the indoor heat exchanger, to heat the room.

In the heating mode, the air conditioning system may include a heater for heating the refrigerant evaporated in the outdoor heat exchanger. When the outdoor temperature is remarkably low, the evaporation of the refrigerant is not smoothly made in the outdoor heat exchanger. In this case, the heater heats the refrigerant and transfers it to the compressor. In more detail, the refrigerant condensed in the indoor heat exchanger is evaporated in the outdoor heat exchanger and is heated by the heater and is sucked into the compressor.

However, in the air conditioning system according to the related art, when the refrigerant condensed in the indoor heat exchanger is heated by the heater, that is, the evaporation of the refrigerant is not made in the outdoor heat exchanger, the refrigerant may be integrated in the outdoor heat exchanger. Therefore, there is a problem in that the refrigerant is lack in the heat exchange cycle.

SUMMARY OF THE INVENTION

An object of the present invention is to provide an air conditioning system configured to improve heating efficiency.

According to an exemplary embodiment of the present invention, there is provided an air conditioning system, including: a compressor compressing a refrigerant; an indoor heat exchanger condensing the refrigerant discharged from the compressor in a heating operation; an outdoor heat exchanger evaporating the refrigerant condensed in the indoor heat exchanger; a heat exchanger evaporated in the outdoor heat exchanger to heat-exchange the refrigerant sucked into the compressor with a high-temperature operating fluid; and a heater including a heating chamber formed with a passage in which the operating fluid transferred to the heat exchanger flows, a heat transferring part having one surface contacting the operating fluid flowing in the passage, two electrodes disposed on the other surface of the heat transferring part, a plurality of carbon nanotube heating elements disposed on the other surface of the heat transferring unit to be spaced away from each other, connected to both ends of the electrodes, and having a contacting area with the heat transferring part to be 50% or more of a contacting area of the heat transferring part and the operating unit, and an insulating member insulating the electrode and the carbon nanotube heating element.

According to an exemplary embodiment of the present invention, there is provided an air conditioning system, including: a compressor compressing a refrigerant; an indoor heat exchanger condensing the refrigerant discharged from the compressor in a heating operation; an outdoor heat exchanger evaporating the refrigerant condensed in the indoor heat exchanger; and a heater including a heating chamber formed with a passage in which the refrigerant flows a heat transferring part having one surface contacting the refrigerant flowing in the passage, two electrodes disposed on the other surface of the heat transferring part, a plurality of carbon nanotube heating elements disposed on the other surface of the heat transferring unit to be spaced away from each other, connected to both ends of the electrodes, respectively, and having a contacting area with the heat transferring part to be 50% or more of a contacting area of the heat transferring part and the operating unit, and an insulating member insulating the electrode and the carbon nanotube heating element According to the present invention, it can more efficiently perform the efficient heating.

DETAILED DESCRIPTION OF THE PREFERRED EMBODIMENTS

Hereinafter, components of an air conditioning system according to a first exemplary embodiment of the present invention will be described in more detail with reference to the accompanying drawings.

Figure 1:
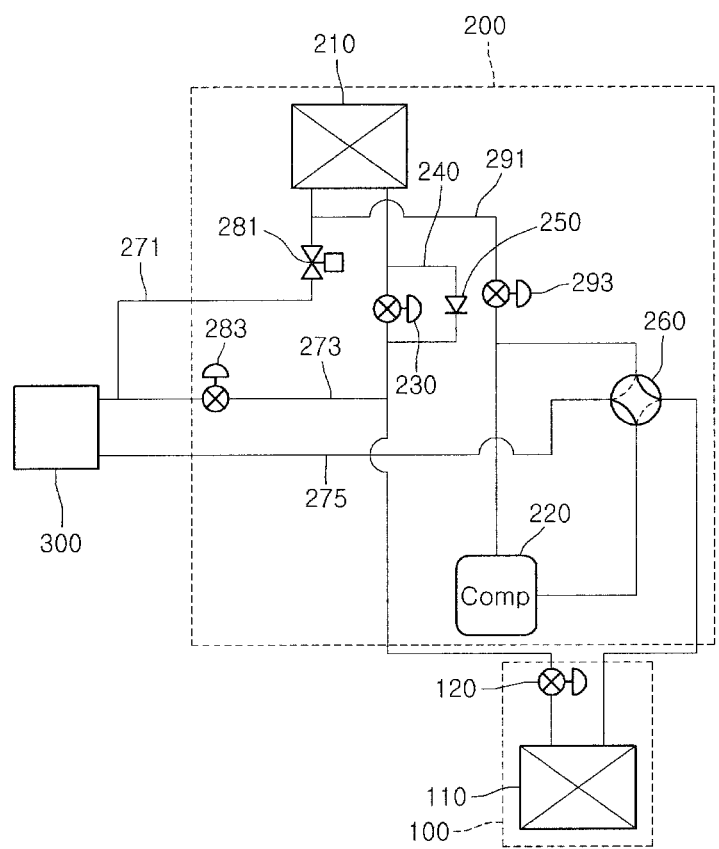
FIG. 1 is a configuration diagram showing an air conditioning system according to a first exemplary embodiment of the present invention.
Figure 2:
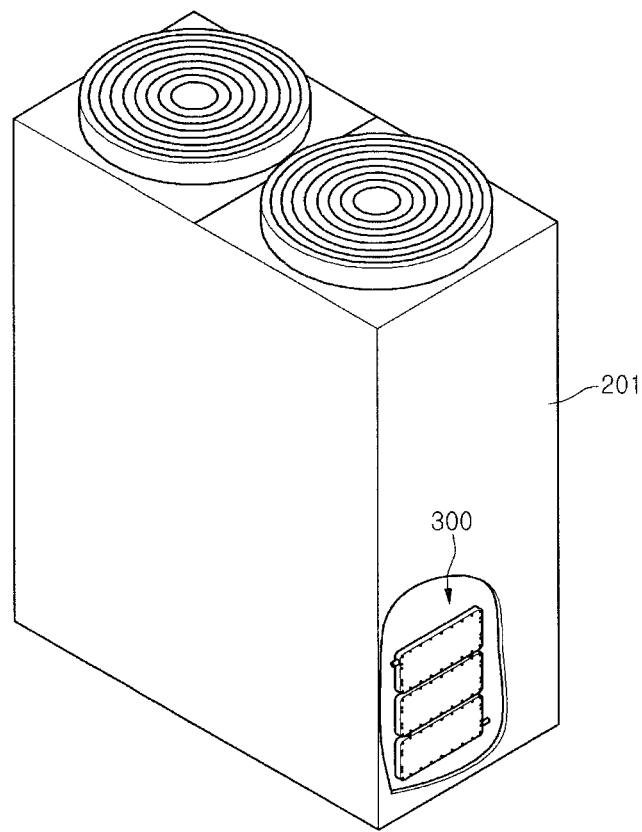
FIG. 2 is a perspective view schematically showing an outdoor machine configuring the first exemplary embodiment of the present invention.

FIG. 1 is a configuration diagram showing an air conditioning system according to a first exemplary embodiment of the present invention and FIG. 2 is a perspective view schematically showing an outdoor machine configuring the first exemplary embodiment of the present invention.

Referring first to FIG. 1, an air conditioning system cools or heats the room by heat-exchanging a refrigerant moving a heat exchanging cycle with an indoor air and an outdoor air. The air conditioning system includes a plurality of indoor machines 100 and 100', an outdoor machine 200, and a heater 300.

In more detail, the indoor machines 100 and 100' are each provided with indoor heat exchangers 110 and 110'. The indoor heat exchangers 110 and 110' are operated as a condenser in a heating mode and are operated as an evaporator in a cooling mode. In other words, in the heating mode, the indoor heat exchangers 110 and 110' receive and condense the refrigerant compressed in a compressor 220 to be described below. In the cooling mode, the indoor heat exchangers 110 and 110' receive and evaporate the refrigerant condensed in an outdoor heat exchanger 210 to be described below.

In addition, the indoor machines 100 and 100' are each provided with linear expansion valves (LEV) 120 and 120'. The linear expansion valves 120 and 120' of the indoor machines 100 and 100' serves to expand the refrigerant evaporated in the indoor heat exchangers 110 and 110' in the cooling mode. The linear expansion valves 120 and 120' of the indoor machines 100 and 100' are opened to pass the refrigerant in the heating mode.

Meanwhile, the outdoor machine 200 is provided with the outdoor heat exchanger 210. The outdoor heat exchanger 210 is operated as the evaporator in the heating mode and is operated as a condenser in the cooling mode. In other words, in the heating mode, the outdoor heat exchanger 210 evaporates the refrigerant condensed in the indoor heat exchangers 110 and 110' and transfers it to the compressor 220. In the cooling mode, the outdoor heat exchanger 210 condenses the refrigerant and transfers it to the indoor heat exchangers 110 and 110'.

Meanwhile, the outdoor machine 200 is provided with the compressor 220. The compressor 220 compresses the refrigerant and discharges it to the indoor heat exchangers 110 and 110' or the outdoor heat exchanger 210. In more detail, the compressor 220 compresses the refrigerant in the heating mode and discharges it to the indoor heat exchangers 110 and 110' and discharges it to the outdoor heat exchanger 210 in the cooling mode.

The outdoor machine 200 is provided with the linear expansion valve 230. The linear expanding valve 230 of the outdoor machine 200 expands the refrigerant condensed in the indoor heat exchangers 110 and 110' in the heating mode and transfers it to the outdoor heat exchanger 210. In the cooling mode, the linear expanding valve 230 of the outdoor machine 200 is closed or the opening thereof is controlled.

In addition, the outdoor machine 200 is provided with a parallel pipe 240 and a check valve 250. The parallel pipe 240 is connected to a refrigerant pipe, in which the refrigerant transferred to the outdoor heat exchanger 210 flows, in parallel. The check valve 250 is installed in the parallel pipe 240.

The outdoor machine 200 is provided with a 4-way valve 260. The 4-way valve 260 is installed in the refrigerant pipe in which the refrigerant compressed and discharged in and from the compressor 220 flows. The 4-way valve 260 discharges the refrigerant compressed in the compressor 220 to the indoor heat exchangers 110 and 110' in the heating mode and is switched into the heating mode to suck the refrigerant evaporated in the outdoor heat exchanger 210 into the compressor 220. The 4-way valve 260 discharges the refrigerant compressed in the compressor 220 to the outdoor heat exchanger 210 in the cooling mode and is switched into the cooling mode to transfer the refrigerant condensed in the outdoor heat exchanger 210 to the indoor heat exchangers 110 and 110'.

The outdoor machine 200 is provided with first to third connection pipes 271, 273, and 275. The first connection pipe 271 connects the outdoor heat exchanger 210 with the heater 300. The refrigerant evaporated in the outdoor heat exchanger 210 and transferred to the heater 300 in the heating mode flows in the first connection pipe 271. The second connection pipe 273 connects the refrigerant pipe, which connects the indoor heat exchangers 110 and 110' with the outdoor heat exchanger 210, with the heater 300. The refrigerant condensed in the indoor heat exchangers 110 and 110' and transferred to the heater 300 in the heating mode flows in the second connection pipe 273. Further, the third connection pipe 275 connects the compressor 220 with the heater 300. The refrigerant heated by the heater 300 and sucked into the compressor 200 in the heating mode flows in the third connection pipe 275.

In addition, the outdoor machine 200 is provided with first and second valves 281 and 283. The first valve 281 is installed in the first connection pipe 271. The first valve 281 is closed when heating the refrigerant by using the heater 300 in the heating mode and does not use the heater 300 in the heating mode or is opened in the cooling mode. The second valve 283 is installed in the second connection pipe 273. The second valve 283 is opened when heating the refrigerant by using the heater 300 in the heating mode and does not use the heater 300 in the heating mode or is closed in the cooling mode.

The outdoor machine 200 is provided with a bypass pipe 291 and a third valve 293. The bypass pipe 291 connects the refrigerant pipe, in which the refrigerant discharged from the compressor 220 in the heating mode and transferred to the indoor heat exchangers 110 and 110' flows, with the first connection pipe 271. The refrigerant compressed in the compressor 220 and discharged to the outdoor heat exchanger 210 flows in the bypass pipe 291. The third valve 293 is installed in the second connection pipe 291. The third valve 293 is opened only when the refrigerant integrated in the outdoor heat exchanger 210 is re-circulated into the heat exchange cycle.

The heater 300 serves to heat the refrigerant evaporated in the outdoor heat exchanger 210 in the heating mode. Referring to FIG. 2, the heater 300 may be installed at one side inside a casing 201 forming the outer appearance of the outdoor machine 200.

Hereinafter, components of a heater according to the first exemplary embodiment of the present invention will be described in more detail with reference to the accompanying drawings.

Figure 3:
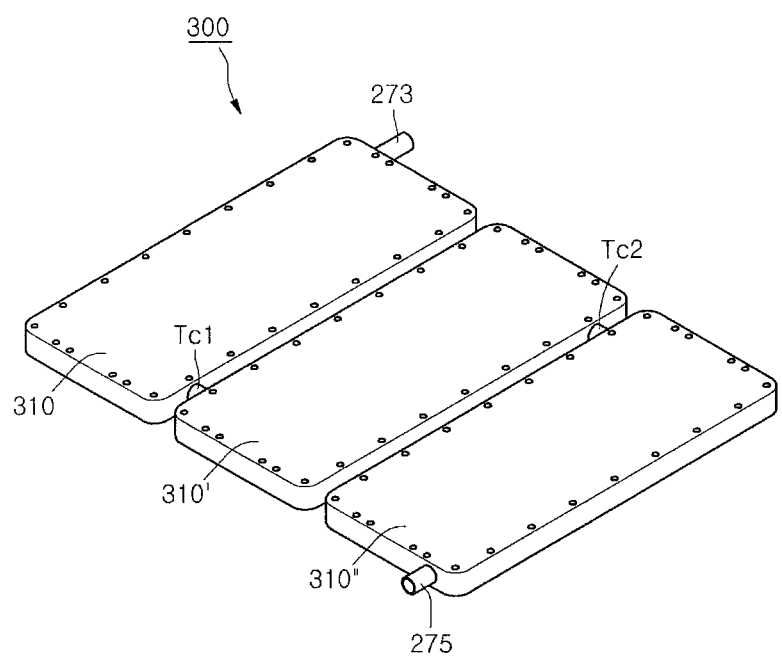
FIG. 3 is a perspective view showing a heater configuring the first exemplary embodiment of the present invention.
Figure 4:
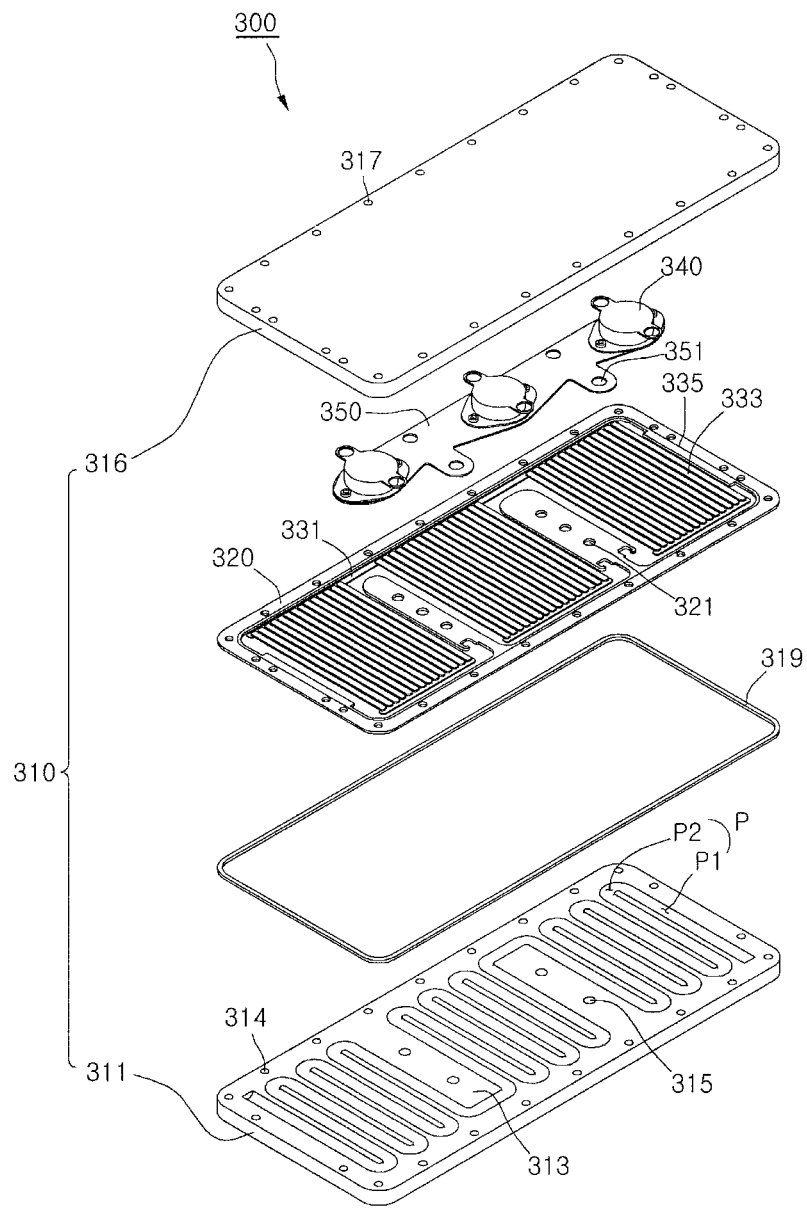
FIG. 4 is an exploded perspective view showing the heater configuring the first exemplary embodiment of the present invention.

FIG. 3 is a perspective view showing a heater configuring the first exemplary embodiment of the present invention and FIG. 4 is an exploded perspective view showing the heater configuring the first exemplary embodiment of the present invention.

Referring to FIGS. 3 and 4, the heater 300 includes a heating chamber 310, a plurality of heating parts, and a heat transferring part 320. The heater 300 is configured in a single unit in which the heating chamber 310, the heating part, and the heat transferring part 320 are included. A passage P in which the refrigerant flows is provided in the heating chamber 310. The heating part is heated in order to heat the refrigerant flowing in the passage P and the heat transferring part 320 transfers the heat from the heater to the refrigerant.

In the first exemplary embodiment, the heating chamber 310 includes first to third heating chambers 310, 310' and 310", as shown in FIG. 3. The first heating chamber 310 receives the refrigerant by the second connection pipe 273 and the first and second heating chambers 310 and 310' are connected to each other by a first connection tube Tc1. In addition, the second and third connection chambers 310' and 310" are connected to each other by a second connection tube Tc2 and the third heating chamber 310" transfers the refrigerant by the third connection pipe 275. This is to control the number of heating chambers 310, 310' and 310" according to the required heating amount of refrigerant Meanwhile, referring to FIG. 4, the heating chamber 310 includes a chamber body 311, a chamber cover 316, and a plurality of sealing member 319. In this case, the chamber body 311 and the chamber cover 316 may be molded of a heat-resistant synthetic resin material In addition, when the chamber body 311 and the chamber cover 316 may be molded by a metal material, the heat insulator for insulating the refrigerant flowing in the passage P may be further provided.

The chamber body 311 is substantially formed in a polyhedral shape of which one surface is opened. A predetermined space for forming the passage P is provided in the chamber body 311.

In addition, a plurality of barrier ribs 312 are provided in the chamber body 311. The barrier rib 312 partitions the inner space of the chamber body 311 to substantially form the passage P in a spiral shape. In more detail, the barrier rib 312 is lengthily formed in the chamber body 311 in an inner short-side direction of the chamber body 311. In this configuration, one end of the barrier rib 312 is connected to one end of the long-side direction of the chamber body 311 and the other end of the barrier rib 312 is spaced away from the other end of the long-side direction of the chamber body 311.

The passage P formed in the spiral shape by the barrier rib 312 includes a plurality of straight sections P1 and a plurality of connection sections P2. The straight section P1 is lengthily formed in a short-side direction of the chamber body 311 and the connection section P2 connects ends of two straight sections P1 adjacent to each other to each other in the long-side direction of the chamber body 311.

Some of the barrier ribs 312, two barrier ribs 312 in the first exemplary embodiment are formed to have a relatively wider width than the remaining barrier rib 312. For the convenience of explanation, the barrier rib 312 having the relatively wider width of the barrier ribs 312 is referred to as a fixing rib 313.

The chamber body 311 is provided with two communication holes (not shown) each communicated with both ends of the passage P. The communication hole is connected to a drawing tube Ti supplied with a refrigerant from the outside or a draw tube To transferring the heated refrigerant to the outside or is connected to the first and second connection tubes Tc1 and Tc2.

The edge surface of the chamber body 311 and the fixing rib 313 are each provided with a plurality of first and second combining holes 314 and 315. The first combining holes 314 is to fix the chamber cover 316 and the second combining hole 315 is to fix the heat transferring part 320.

Meanwhile, the chamber cover 316 is formed to have the size and the shape capable of closing the opened surface of the chamber body 311. The edges of one surface of the chamber cover 316 are combined by the combining hole (not shown) in the state where it is closely attached to the edge surface of the chamber body 311. To this end, the chamber cover 316 is provided with a first through hole 317. The first through hole 317 is a portion through which the combining hole combined with the first combining hole 314 penetrates.

The sealing member 319 serves to prevent the leakage of the refrigerant flowing in the passage P. The sealing member 319 is positioned between the chamber body 311 and the chamber cover 316, in more detail, between the edge surface of the chamber body 311 and the edge of one surface of the chamber cover 316 that are closely attached to each other.

The heat transferring part 320 is positioned in the heating chamber 310, that is, between the chamber body 311 and the chamber cover 316. The heat transferring part 320 serves to transfer the heat from the heating part to the refrigerant flowing in the passage P. The heat transferring part 320 forms the chamber body 311 and the passage P. Therefore, the refrigerant flowing in the passage P contacts one surface of the heat transferring part 320. To this end, the heat transferring part 320 is molded of a material having the predetermined heat conductivity and the heat transferring part 320 is at least formed to the size and the shape capable of closing the inner space of the chamber body 311. Therefore, in the first exemplary embodiment, the heat transferring part 320 is formed in a rectangular metal plate shape. In addition, the heat transferring part 320 is provided with a plurality of second through holes 321. The second through hole 321 is a portion through which the combining hole (not shown) combined with the second combining hole 315 penetrates, in order to fix the heat transferring part 320.

The heating part is provided on the other surface of the heat transferring part 320 corresponding to an opposite side of one surface of the heat transferring part 320 contacting the refrigerant flowing in the passage P. In the first exemplary, the heating part includes two electrodes 331, a plurality of carbon nanotube heating element 333, and an insulating member 335.

In more detail, the electrode 331 is disposed on the other surface of the heat transferring part 320 to be spaced away from each other. In the first exemplary embodiment, the electrode 331 is lengthily formed in the long-side direction of the heat transferring part 320 to be spaced away from each other in the short-side direction of the heat transferring part 320.

The carbon nanotube heating element (hereinafter, referred to as 'CNT heating element') implies a material formed of carbon nanotube having a tube shape by connecting hexagons formed of 6 carbons to each other. The CNT heating element 333 is lengthily formed in a short-side direction of the heat transferring part 320 to be spaced away from each other in the width direction of the heat transferring part 320. In this case, the CNT heating element 333 is entirely disposed in the region of the heat transferring part 320 contacting the refrigerant flowing in the passage P other than the region corresponding to the fixing rib 313. As described above, the reason why the CNT heating element is formed in plural is that the remaining CNT heating elements 333 are normally operated, even though any one or more of the CNT heating elements 333 are disconnected. Both ends of the CNT heating element 333 are each connected to the electrode 331. In this case, the interval between the CNT heating element 333 adjacent to each other is determined to be smaller than a width of the short-side direction of the heat transferring part 320. In addition, the sum of the contacting area of the plurality of CNT heating elements 333 and the heat transferring part 320 is determined to be at least 50% or more of the contacting area of the heat transferring part 320 and the refrigerant flowing in the passage P. This is to maximally heat the refrigerant flowing in the passage P in the range of preventing the short-circuit of the CNT heating element 333.

The insulating member 335 serves to insulate the electrode 331 and the CNT heating element 333. For example, the insulating member 335 may be entirely applied or coated on the other surface of the heat transferring part 320 on which the electrode 331 and the CNT heating element 333 are disposed.

Further, the heater 300 includes three bimetals 340 in order to prevent the overheating of the CNT heat element 333. The bimetal 340 interrupts power applied to the CNT heating element 333 when the temperature of the CNT heating element 333 is the predetermined safe temperature or more. In the first exemplary embodiment, the bimetal 340 is fixed to the installation bracket 350 and the installation bracket 350 is fixed to the chamber body 311 together with the heat transferring part 320. To this end, a plurality of through holes 351 are formed in the installation bracket. The combining part penetrating through the third through holes 351 and the second through holes 321 are combined with the second combining hole 315. In the first exemplary embodiment, the bimetal 340 substantially senses the temperature in the heating chamber 310. However, the bimetal 340 may directly sense the temperature of the CNT heating element 333.

Meanwhile, the electrode 31 may be connected to a single-phase or three-phase input power supply according to the output of the CNT heating element 133. For example, when the output of the CNT heating element 133 is 4 KW or less, the electrode may be connected to the single-phase input power supply and when it is 4 KW or more, the electrode may be connected to the three-phase input power supply.

Hereinafter, the effect of the air conditioning system according to the first exemplary embodiment of the present invention will be described in more detail.

Referring to FIG. 1, in the heating mode using the heater 300, the linear expansion valve 230, the first valve, and the third valve of the outdoor machine 200 are closed and the second valve is opened. The heating part 320 is operated to heat the refrigerant circulating the heater 300. Therefore, the refrigerant flowing in the heat exchange cycle is heated by the heater 300 and is sucked into the compressor 220. The 4-way valve 260 is switched into the heating mode.

In more detail, the refrigerant compressed in the compressor 220 is discharged to the indoor heat exchangers 110 and 110' through the 4-way valve 260. The refrigerant transferred to the indoor heat exchangers 110 and 110' is heat-exchanged to be condensed. As a result, the room is heated.

Next, the refrigerant condensed in the indoor heat exchangers 110 and 110' flows in the second connection pipe 273 and is transferred to the heater 300 in the state in which it pass through the linear expansion valves 120 and 120' of the opened indoor machines 100 and 100'. In this case, the refrigerant flowing in the second connection pipe 273 and transferred to the heater 300 is expanded by the second valve 283.

Meanwhile, the refrigerant transferred to the heater 300 flows in the heating chamber 310, that is, the passage P. The refrigerant flowing in the passage P is sucked into the compressor 220 through the third connection pipe 275. Of course, when the heating chamber 310 is configured in plural, the refrigerant flows in the passage P of the plurality of heating chambers 310 through the connection tubes Tc1 and Tc2.

When power is applied, the CNT heating element 333 is heated. The heat from the CNT heating element 333 is transferred to the refrigerant flowing in the passage P through the heat transferring part 320. In other words, the refrigerant flowing in the passage P is heated by the CNT heating element 333.

However, in the first exemplary embodiment, the CNT heating elements 333 are configured to maximally heat the refrigerant flowing in the passage P in the range where they can prevent the short-circuit therebetween. Therefore, the refrigerant flowing in the passage P may be more stably and efficiently heated by using the CNT heating element 333.

In addition, when the CNT heating element 333 is overheated, power applied to the CNT heating element 333 is interrupted by the bimetal 340. Therefore, the problem due to the overheating of the CNT heating element 333, for example, the overheating of the refrigerant flowing in the passage P or the damage of the heat transferring part 320 or the heating chamber 310 can be prevented.

The refrigerant heated by the heater 300 flows in the third connection pipe 275 and is sucked into the compressor 220, such that the refrigerant circulates the heat exchange cycle. In this case, since the third valve 293 is closed, the phenomenon that the refrigerant compressed in the compressor 220 flows in the bypass pipe 291 and is discharged to the outdoor heat exchanger 210 is prevented. In addition, the phenomenon that the refrigerant compressed in the compressor 200 is discharged to the outdoor heat exchanger 210 through the parallel pipe 240 by the check valve 250 is prevented.

Figure 5:
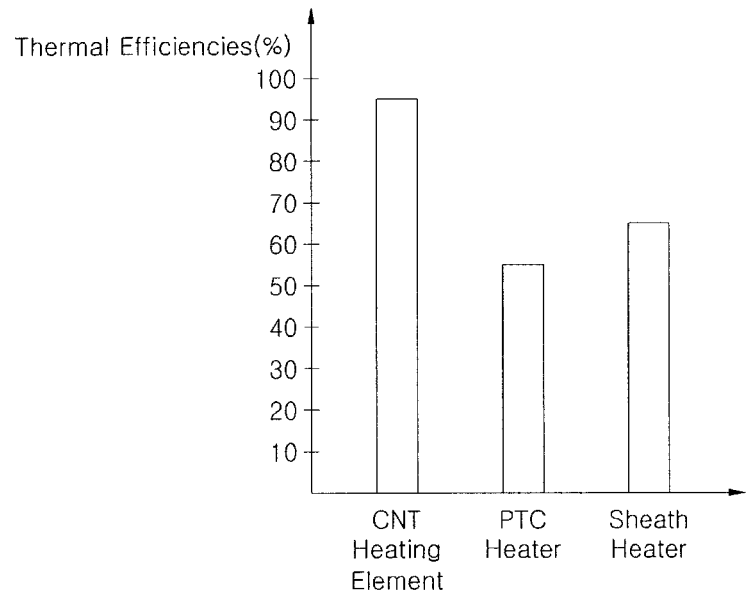
FIG. 5 is a graph showing heat efficiency according to a type of a heater.

FIG. 5 is a graph showing heat efficiency according to a type of a heater;

Referring to FIG. 5, it can be appreciated that the heat efficiency of the CNT heating element 333 is relatively higher than that of a positive temperature coefficient (PTC) heater and a sheathe heater. In other words, when the same power of energy is applied, the CNT heating element 333 shows the heat efficiency of approximately 95% or so, but the PTC heater shows the heat efficiency of approximately 55% and the sheathe heater shows the heat efficiency of approximately 65%

In addition, the CNT heating element 333 may be changed to have various shapes as compared to the sheathe heater. The CNT heating element 333 can easily secure rigidity as compared to the PTC heater. Therefore, the CNT heater 333 may have the excellent merits in the heat efficiency, or the like, as compared to the general PTC heater or the sheathe heater in the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The foregoing exemplary embodiments, the bimetal is configured in three but is not necessarily limited thereto. That is, the number of bimetals may be determined differently according to the size of the heating chamber.

In addition, in the foregoing exemplary embodiments, the heating chamber is configured in three and is spaced away from each other in the short-side direction and the number and arrangement direction of heating chambers are not limited thereto.

Hereinafter, components of an air conditioning system according to a second exemplary embodiment of the present invention will be described in more detail with reference to the accompanying drawings.

Figure 6:
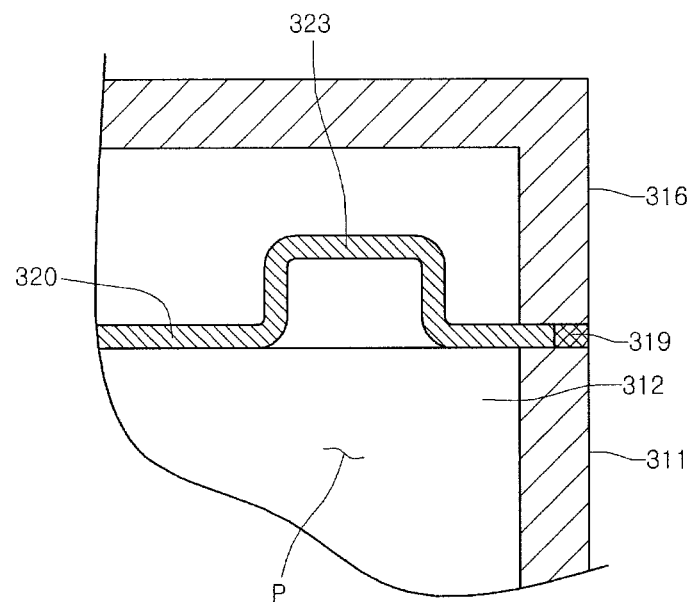
FIG. 6 is a longitudinal cross-sectional view showing main components of a heater of an air conditioning system according to a second exemplary embodiment of the present invention.

FIG. 6 is a longitudinal cross-sectional view showing main components of a heater of an air conditioning system according to a second exemplary embodiment of the present invention. The same components as those of the first exemplary embodiment among components of the second exemplary embodiment recite reference numerals of FIGS. 3 and 4 and the detailed description thereof will be omitted.

Referring to FIG. 6, in the second exemplary embodiment, the heat transferring part 320 is provided with a plurality of reinforcing forming parts 323. The reinforcing forming part 323 is formed by forming a part of the heat transferring part 320 in order to prevent the thermal deformation of the heat transferring part 320. In this case, the reinforcing forming part 323 is formed by forming a part of the heat transferring part 320 toward an opposite side of the passage P, that is, the chamber cover 316, not the chamber body 311. Therefore, the interference of the refrigerant flowing in the passage P may be minimized by the reinforcing forming part 323 and the contact area with the refrigerant flowing in the passage P may be relatively increased.

Hereinafter, components of an air conditioning system according to a third exemplary embodiment of the present invention will be described in more detail with reference to the accompanying drawings.

Figure 7:
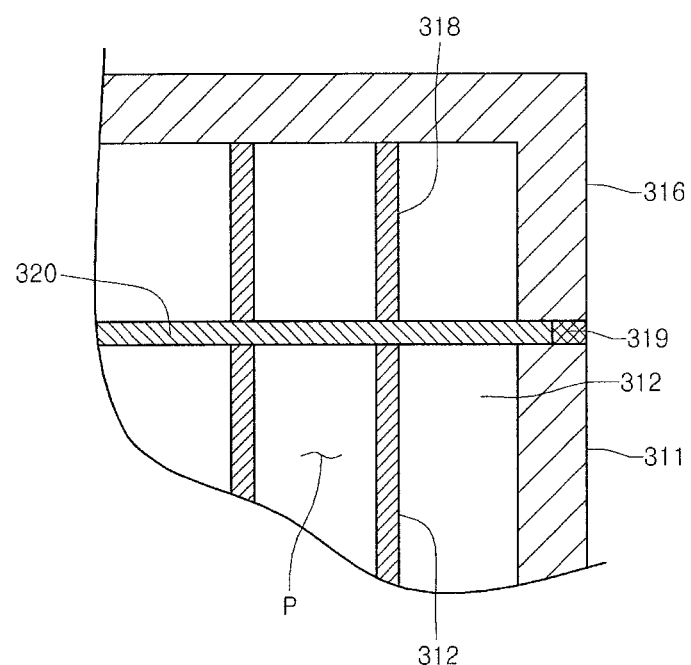
FIG. 7 is a longitudinal cross-sectional view showing main components of a heater of an air conditioning system according to a third exemplary embodiment of the present invention.

FIG. 7 is a longitudinal cross-sectional view showing main components of a heater of an air conditioning system according to the present invention. The same components as those of the first exemplary embodiment among components of the third exemplary embodiment recite reference numerals of FIGS. 3 and 4 and the detailed description thereof will be omitted.

Referring to FIG. 7, in the fourth exemplary embodiment, the inside of the chamber cover 316 is provided with the plurality of reinforcing forming parts 318. The reinforcing rib 318 serves to prevent the thermal deformation of the heat transferring part 320. To this end, the reinforcing rib 318 is extended from the inner surface of the chamber cover 316 and the front end thereof is closely attached to the other surface of the heat transferring part 320. More preferably, the reinforcing rib 318 is formed at a position corresponding to any one of the barrier ribs 312. Therefore, the heat transferring unit 320 is pressed by the barrier rib 312 and the reinforcing rib 318 corresponding to each other, thereby making it possible to more efficiently prevent the thermal deformation of the heat transferring part 320.

Hereinafter, components of an air conditioning system according to a fourth exemplary embodiment of the present invention will be described in more detail with reference to the accompanying drawings.

Figure 8:
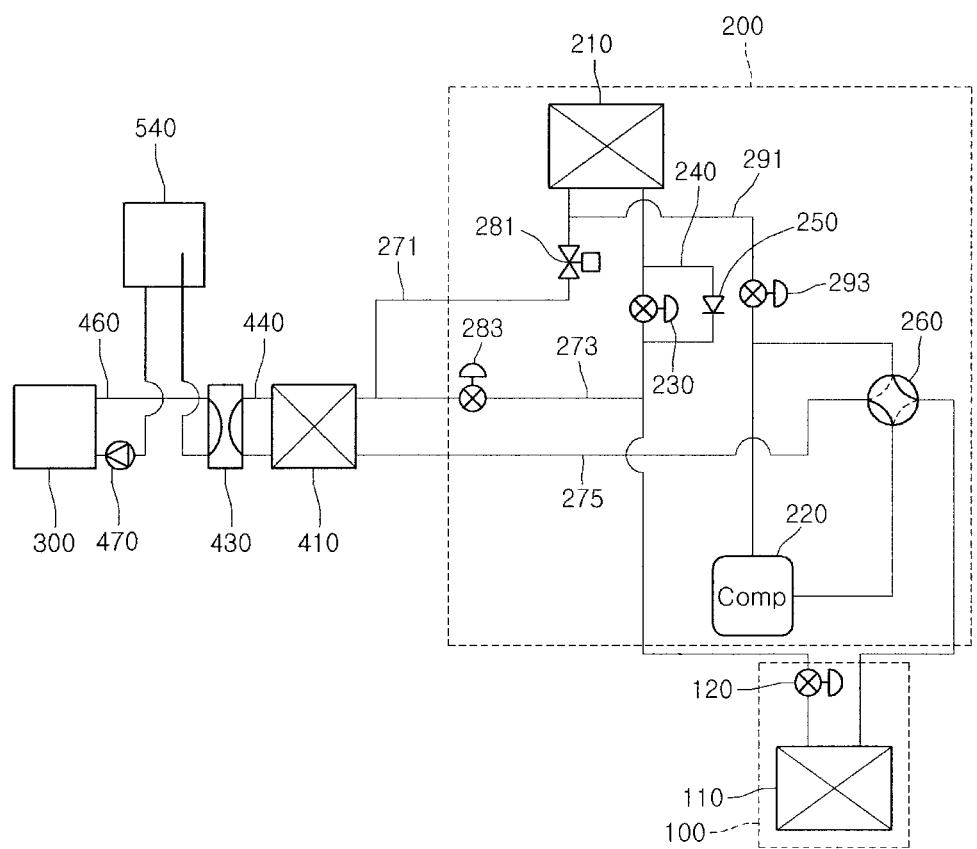
FIG. 8 is a configuration diagram showing an air conditioning system according to a fourth exemplary embodiment of the present invention.

FIG. 8 is a configuration diagram showing an air conditioning system according to a fourth exemplary embodiment of the present invention. The same components as those of the first exemplary embodiment among components of the fourth exemplary embodiment recite reference numerals of FIGS. 1 to 4 and the detailed description thereof will be omitted.

Referring to FIG. 8, the fourth exemplary embodiment includes a sub-heat exchanger 410, a heat exchanger 430, a heating pipe 440, a fluid tank 450, a fluid pipe 450, and a pump 470. The sub-heat exchanger 410 is supplied with the refrigerant circulating the heat exchange cycle. The heater 300 heats an operating fluid stored in the fluid tank 450. In addition, the heat exchanger 430 heat-exchanges the refrigerant supplied with the sub-heat exchanger 410 with the operating fluid heated by the heater 300. Each of the heating pipe 440 and the fluid pipe 460 is a portion where the refrigerant transferred to the sub-heat exchanger 410 and the operating fluid heated by the heater 300 are circulated. Therefore, the refrigerant circulating the heating pipe 440 and the operating fluid flowing in the fluid pipe 460 are substantially heat-exchanged in the heat exchanger 430. The pump 470 serves to circulate or transport the fluid stored in the fluid tank 450 in or to the heat exchanger 430 by heating it by the heater 300 the heat exchanger 430.

Meanwhile, the heater 300 configuring the fourth exemplary embodiment may be configured to have the same configuration as the heater configuring the first to third exemplary embodiments of the present invention. However, in the first to third exemplary embodiments, the refrigerant is directly heated by the heater, while in the fourth exemplary embodiment, the operating fluid is heated by the heater 300. Further, when the operating fluid is water, a part of the operating fluid heated by the heater 300, that is, water may be used for hot water.

As described above, the air conditioning system according to the present invention can obtain the following effects.

First, in the present invention, the refrigerant is sucked into the compressor in a state heated by the refrigerant heater in the heating mode. Therefore, the sufficient heating efficiency can be secured.

In the present invention, the refrigerant is heated by the carbon nanotube heating element. Therefore, the refrigerant can be more efficiently heated by the carbon nanotube heating element.

In the present invention, the heating chamber forming the passage in which the refrigerant flows and the carbon nanotube heating element are configured in a single unit. Therefore, the configuration of the heater is more simplified, such that the heater is easily installed.

In addition, in the present invention, the plurality of heating chambers can be used by being connected to each other according to the required heating amount. Therefore, the design of the heater can easily be changed according to the required heating amount.

In the present invention, the total sum of the contacting area of the plurality of CNT heating elements and the heat transferring part contacting the refrigerant or the operating fluid is determined to be 50% or more of the contacting area of the heat transferring part contacting the refrigerant or the operating fluid. In addition, the interval between the carbon nanotube heating elements is determined to the width or less of the carbon nanotube heating element. Therefore, the carbon nanotube heating element can maximally heat the fluid in the range where the thermal deformation of the heat transferring unit can be prevented.

In addition, in the present invention, the fluid in which the refrigerant or the operating fluid flows is substantially formed in a spiral shape and the carbon nanotube heating element is disposed in a direction parallel to a direction in which the refrigerant or the operating fluid flows in the passage. Therefore, the refrigerant or the operating fluid flowing in the fluid is more efficiently made by the carbon nanotube heating element.

Further, in the present invention, power is applied to the carbon nanotube heating element by the bimetal according to whether the carbon nanotube heating element is overheated. Therefore, the fluid can be more safely heated.

What is claimed is:
1. An air conditioning system, comprising:
a compressor that compresses a refrigerant;
an indoor heat exchanger that condenses the refrigerant discharged from the compressor in a heating operation;
an outdoor heat exchanger that evaporates the refrigerant condensed in the indoor heat exchanger and that has an inlet to introduce the refrigerant and an outlet to discharge evaporated refrigerant; and
a heater comprising:
a heating chamber formed with a passage in which the refrigerant flows and a heat transferring part having a one surface contacting the refrigerant flowing in the passage,
electrodes disposed on another surface of the heat transferring part,
a plurality of carbon nanotube heating elements disposed on the other surface of the heat transferring part spaced away from each other, connected to ends of the electrodes, respectively,
an insulator that insulates the electrodes and the carbon nanotube heating elements, and a first conduit that connects the outdoor heat exchanger with the heater to selectively guide refrigerant evaporated at the outdoor heat exchanger to the heater;

a second conduit that connects a pipe connecting the indoor heat exchanger and the outdoor heat exchanger with the heater to allow refrigerant condensed at the indoor heat exchanger to introduce into an inside of the heater, each end of the pipe being connected to the indoor heat exchanger and the outdoor heat exchanger respectively; and an indoor expansion valve disposed on the pipe to decompress the refrigerant in a cooling mode;

an outdoor expansion valve disposed on the pipe to decompress the refrigerant in a heating mode;

a valve disposed on the second conduit to selectively close the second conduit;

a third conduit that connects the compressor with the heater to guide refrigerant heated in the heater to the compressor, and wherein the second conduit comprises a first end connected to the pipe and a second end connected to the heater, and the pipe is connected to one of the inlet and the outlet of the outdoor heat exchanger and the first conduit is connected to the other one of the inlet and the outlet of the outdoor heat exchanger.

2. The air conditioning system according to claim 1, further comprising:

a heat exchanger to heat-exchange the refrigerant drawn into the compressor with a high-temperature operating fluid.

3. The air conditioning system according to claim 2, further comprising: a storage tank that stores the operating fluid, wherein the operating fluid stored in the storage tank is transferred to the heater, transferred to the heat exchanger in a heated state, and transferred to the storage tank in a state where the operating fluid is heat-exchanged with the refrigerant in the heat exchanger.

4. The air conditioning system according to claim 3, wherein the operating fluid is water and at least some of the water heated by the heater is used for hot water.

5. The air conditioning system according to claim 1, wherein the passage is formed in a spiral shape.

6. The air conditioning system according to claim 5, wherein the passage is formed in a spiral shape by a plurality of barrier ribs provided in the heating Chamber.

7. The air conditioning system according to claim 1, wherein the passage includes a plurality of straight sections parallel with each other and a connection section connecting one end of the straight section.

8. The air conditioning system according to claim 7, wherein the carbon nanotube heating elements are formed in a lengthwise direction parallel with each of the straight sections and are spaced away from each other in a direction parallel with the straight sections by an interval less than a width of the carbon nanotube heating element in a direction parallel with the straight sections.

9. The air conditioning system according to claim 1, wherein the heating chamber is configured in plurality so that the heating chambers are connected by connectors provided in each chamber.

10. The air conditioning system according to claim 1, wherein the heating chamber includes:

a chamber body having a one surface that is open and has the passage formed therein; and a chamber cover closing the one surface of the opened chamber body.

11. The air conditioning system according to claim 1, wherein the heat transferring part is formed in a rectangular plate shape.

12. The air conditioning system according to claim 1, wherein the carbon nanotube heating elements are formed lengthwise in a short-side direction of the heat transferring part and are spaced away from each other by an interval in a long-side direction of the heat transferring part.

13. The air conditioning system according to claim 12, wherein the interval between the carbon nanotube heating elements adjacent to each other is less than a width of the carbon nanotube heating element in a long-side direction of the heat transferring unit.

14. The air conditioning system according to claim 1, further comprising:

a first conduit valve that selectively closes the first conduit.

15. The air conditioning system according to claim 1, wherein the second conduit valve is an expansion device that expands refrigerant transferred to the heater.

16. The air conditioning system according to claim 1, further comprising:

a bypass conduit that connects another pipe connecting the compressor and the indoor heat exchanger with the first conduit; and a third valve that selectively closes the bypass conduit.

* * * * *